United States Patent
Djin et al.

(10) Patent No.: US 9,674,134 B2
(45) Date of Patent: Jun. 6, 2017

(54) CROWDSOURCING USER-PROVIDED IDENTIFIERS AND ASSOCIATING THEM WITH BRAND IDENTITIES

(71) Applicant: Google Inc., Mountain View, CA (US)

(72) Inventors: Twum Djin, Santa Clara, CA (US); Andrew Chang Huang, Menlo Park, CA (US); Timothy Youngjin Sohn, Mountain View, CA (US); Jacqueline Amy Tsay, Mountain View, CA (US); Hiba Wasef Fakhoury, San Francisco, CA (US)

(73) Assignee: Google Inc., Mountain View, CA (US)

( * ) Notice: Subject to any disclaimer, the term of this patent is extended or adjusted under 35 U.S.C. 154(b) by 109 days.

(21) Appl. No.: 13/783,076

(22) Filed: Mar. 1, 2013

(65) Prior Publication Data
US 2014/0250192 A1     Sep. 4, 2014

(51) Int. Cl.
G06F 15/16     (2006.01)
H04L 12/58     (2006.01)
H04L 12/18     (2006.01)

(52) U.S. Cl.
CPC .......... H04L 51/32 (2013.01); H04L 12/1859 (2013.01)

(58) Field of Classification Search
CPC ..... H04L 12/58; H04L 51/32; H04L 12/1859; H04L 63/104; H04L 63/102; H04L 12/588; H04L 51/10; H04L 67/26; G06F 17/28; G06F 17/30; G06F 15/16; G06F 17/30719; G06F 17/3053; G06F 17/3097; G06Q 50/01; G06Q 30/0242; G06Q 30/2017; G06Q 30/2031; G06Q 30/0241

USPC .............................................. 709/206; 707/5
See application file for complete search history.

(56) References Cited

U.S. PATENT DOCUMENTS

| 8,380,803 | B1 | 2/2013 | Stibel et al. | |
|---|---|---|---|---|
| 8,909,542 | B2* | 12/2014 | Montero et al. | 705/14.21 |
| 2005/0149397 | A1* | 7/2005 | Morgenstern | G06Q 30/02 705/14.52 |
| 2009/0198675 | A1* | 8/2009 | Mihalik et al. | 707/5 |
| 2011/0153423 | A1 | 6/2011 | Elvekrog et al. | |
| 2012/0124073 | A1 | 5/2012 | Gross et al. | |
| 2012/0131139 | A1 | 5/2012 | Siripurapu et al. | |
| 2012/0179449 | A1* | 7/2012 | Raskino et al. | 704/2 |

(Continued)

FOREIGN PATENT DOCUMENTS

KR     10-2010-0116241 A     11/2010

OTHER PUBLICATIONS

Extended European search report dated Oct. 20, 2016, which issued in European Application No. 14756756.4.

*Primary Examiner* — Umar Cheema
*Assistant Examiner* — Anh Nguyen
(74) *Attorney, Agent, or Firm* — McDermott Will & Emery LLP

(57) ABSTRACT

A system and method for crowdsourcing user-provided brand identifiers and distributing content based on crowdsourced identifiers is provided. Different user-provided brand identifiers are extracted from messages provided by users of a social network. The identifiers are aggregated into two or more aggregate identity groups. When a brand identifier associated with a user request for content is determined to be in at least one of the aggregate identity groups, content items comprising one or more other brand identifiers of the at least one aggregate identity group are provided to the user.

23 Claims, 8 Drawing Sheets

(56) References Cited

U.S. PATENT DOCUMENTS

| | | | |
|---|---|---|---|
| 2012/0265806 A1* | 10/2012 | Blanchflower et al. | 709/204 |
| 2013/0018869 A1 | 1/2013 | Hanson et al. | |
| 2013/0144891 A1* | 6/2013 | Nagasaka et al. | 707/749 |
| 2013/0290110 A1* | 10/2013 | LuVogt | G06F 17/30867 705/14.66 |
| 2013/0339064 A1* | 12/2013 | Denning | G06Q 40/08 705/4 |
| 2014/0025735 A1* | 1/2014 | Garcia-Martinez et al. | 709/204 |
| 2014/0032361 A1* | 1/2014 | Gudorf | G06Q 30/0625 705/26.7 |

\* cited by examiner

CROWDSOURCING USER-PROVIDED IDENTIFIERS AND ASSOCIATING THEM WITH BRAND IDENTITIES

BACKGROUND

Consumer community products such as online social networks and online forums often face a challenge in onboarding known entities such as celebrities, retailers and manufacturers. These brand entities are often great sources of content and great proxies for new member's lifestyle choices because of their popularity, making them critical for adoption and expansion of the community product. For many community products, failure to attract well established brand entities early results in the "empty room" problem because new members do not know or trust other members enough to subscribe to their content and are unwilling to do the work to get to know others. This is triggered by low content consumption, low subscription rates, and results in low creation from de-motivated content creators.

Early consumer community members (e.g., of a social network or forum) may share content about brand entities that have not themselves joined the community. This content, if distributed more widely, may have the ability to attract more interaction and community growth due to the popularity of the associated brand entity. Unfortunately, traditional relationship building on community products require community members to seek out content creators, many of whom they would not know. Without a clear mechanism for organizing relevant content regardless of prior relation to the content creator, consumer communities invariably suffer from the chicken-and-egg problem between content creation and discoverability.

While partnering with brand entities early in the life of a community product is desirable, brand entities may be hesitant to invest in a new marketing channel until they can be convinced of some return on investment (ROI). At the same time community products need them to attract members.

SUMMARY

The subject technology provides a system and method for crowdsourcing user-provided brand identifiers and distributing content based on crowd-sourced identifiers. According to one aspect, a computer-implemented method may comprise extracting a plurality of different user-provided brand identifiers from messages provided by a plurality of users of a social network, aggregating the plurality of different user-provided brand identifiers into two or more aggregate identity groups, receiving a content subscription request comprising a first brand identifier, determining the first brand identifier is in at least one of the aggregate identity groups, and providing, to a user associated with the content subscription request, content items comprising one or more other brand identifiers of the at least one aggregate identity group. Other aspects include corresponding systems, apparatus, and computer program products for implementation of the computer implemented method.

The previously described aspects and other aspects may include one or more of the following features. For example, the respective user-provided brand identifier may be a hashtag. The content items may comprise social media messages transmitted within the social network by other users of the social network. The method may further comprise determining, for a respective aggregate identity group, one or more brand identities, and providing content related to the one or more brand identities to users of the social network who have indicated a desire to receive brand-related content by subscribing to a brand identifier of the respective aggregate identity group. In this regard, the respective brand identity may be representative of a celebrity, a retail product, or a product manufacturer. Additionally or in the alternative, the first brand identifier may not be currently associated with any aggregate identity group, and the method may comprise, after receiving the first brand identifier, associating the first brand identifier with the respective aggregate identity group, and providing, based on the associating, content related to the one or more brand identities to the user associated with the content subscription request.

The plurality of different user-provided brand identifiers may be aggregated into two or more aggregate identity groups based on a predetermined algorithm. In this regard, the predetermined algorithm may comprise comparing the plurality of different user-provided brand identifiers using a phonetic algorithm, approximate string matching, or by determining the edit distance or hamming distance between each of the different brand identifiers. The method may also comprise, extracting a plurality of meta identifiers from a plurality of content items provided by a content provider for the social network, aggregating the plurality of meta identifiers into two or more content meta groups, associating a respective content meta group with the at least one aggregate identity group, and providing, based on the user-provided identifier, content items associated with meta identifiers of the content meta group to the user. Associating the respective content meta group with the at least one aggregate identity group may comprise comparing one or more meta identifiers of the respective content meta group with one or more identifiers of the at least one aggregate identity group, and determining, based on the comparing, that the one or more meta identifiers are related to the one or more identifiers.

In another aspect, a machine-readable medium may have instructions stored thereon that, when executed, cause a machine to perform a method. Accordingly, the method may comprise receiving a plurality of different brand identifiers from a plurality of users in a social network, coalescing the plurality of different brand identifiers into two or more groups of similar identifiers based on a predetermined algorithm, and associating one or more brand identifiers of a respective group of similar identifiers with one or more brand identities so that a subsequent search based on the one or more brand identifiers returns content for the one or more brand identities. Other aspects include corresponding systems, apparatus, and computer program products for implementation of the computer implemented method.

The previously described aspects and other aspects may include one or more of the following features. For example, the method may further comprise receiving a content subscription request for the one or more brand identifiers, wherein the subsequent search is initiated in response to the content subscription request. The content subscription request may be received before the one or more brand identifiers are associated. In this regard, the method may further comprise requesting whether a user associated with the content subscription request would like to subscribe to content related to the one or more brand identifiers when it becomes available, and receiving, in response to the requesting, an indication that the user is interested in receiving content for the one or more brand identifiers. The predetermined algorithm may comprise a phonetic algorithm, approximate string matching, or determining the edit distance or hamming distance between each of the plurality of different user-provided identifiers.

The method may further comprise determining a popularity rating for one or more of the plurality of different brand identifiers, and providing one or more of the plurality of different brand identifiers for display according to their popularity ratings. The step of coalescing may further comprise providing an interface for selection of one or more of the plurality of different brand identifiers, and receiving an instruction to place a selected one of the different brand identifiers into one of the two or more groups of similar identifiers. Associating the one or more brand identifiers with the one or more brand identities may comprise replacing the one or more brand identifiers with a common brand identifier for the one or more brand identities. The content returned for the one or more brand identities may comprise returning content that is provided to activity streams of one or more users of the social network in connection with the one or more associated brand identifiers. Additionally or in the alternative, the method may further comprise receiving content items annotated with meta data, coalescing meta data that satisfies a threshold of similarity, and associating the coalesced meta data with the respective group of similar identifiers, wherein the returned content comprises content items associated with the coalesced meta data.

In a further aspect, a system may include a display screen, one or more processors, and a memory. The memory may include server instructions thereon that, when executed, cause the one or more processors to receive a plurality of different user-provided identifiers from a plurality of users, determine that two or more of the plurality of different user-provided identifiers refer to an established brand, associate the two or more different user-provided identifiers with the established brand so that the established brand may be indexed by any one of the two or more different user-provided identifiers, receive a subsequent identifier from a user, determine that the subsequent identifier is one of the two or more different user-provided identifiers, and return the established brand to the user.

These and other aspects may provide one or more of the following advantages. For example, friction related to getting relevant content is reduced. Community product creators and owners are provided with a solution to attracting new members in the absence of well-established brands and so avoiding starvation and possible demise due to empty room scenarios. Brands may be understood to be a proxy about lifestyle choices, tastes and interests than community member with which we may have no prior relationship. Data related to how popular a brand identity has become within the community may be provided to attract brand entities. Data may also be provided about top promoters of those brand entities, to illustrate effective proxies for distributing content.

By allowing a creators effort to provide distribution rewards and a possibility of prominence in association with a popular brand, content creators are encouraged to provide more meta information in connection with their content. Meta information provided by content managers to their content has additional rich information (e.g. prices, locations, styles, and the like) that can automatically be associated with the content allowing the subject technology to make other inferences about the brand identity and community members who interact with the content, providing a mechanism to create relationships across content.

The subject technology also ensures that new members can quickly subscribe to feeds of content about well-know brands, even before these brands are present on the product may mitigate the empty room problem as well as improve distribution of early adaptors content. It will also provide relevant data to product owners about which brands are popular and worth pursuing partnerships with. It also would serve as an incentive for drawing brands, voluntarily, to the community product by making it clear that the brand has a ready audience for its content.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

Brand identifiers in the form of hashtags and other user-provided identifiers may be used to aggregate data on popular social networking services. However, there may be many disparate hashtags used by different members of an online social community for the same purpose, and no service has been able to tie these disparate tags to one another or, ultimately, to a brand entity (e.g., a celebrity, retailer, or manufacturer). Certain applications have been implemented to identify keywords and their relationships to known entities, but these implementations are not concerned with using disparate keywords to subscribe to content on a community product, where such association is critical for content discoverability and community growth.

When operably coupled to a community product, the subject technology identifies recurrences of brand identifiers for subject matter (e.g., hashtags) used by community members, consolidates them into groups, and associates the groups with established brand identities. Dissimilar identifiers within a group that are not directly associated with any brand identity may then be associated with brand identities of other identifiers in the group. Likewise, content managers may review consolidated groups to determine which identities should be directly or indirectly (through the group) associated with a brand identity. Content managers may further choose to remove or add identifiers to or from a group. In this manner, it is not necessary for an identifier to be associated with a brand before the identifier is used by a community member to subscribe to brand-related content.

Figure 1:
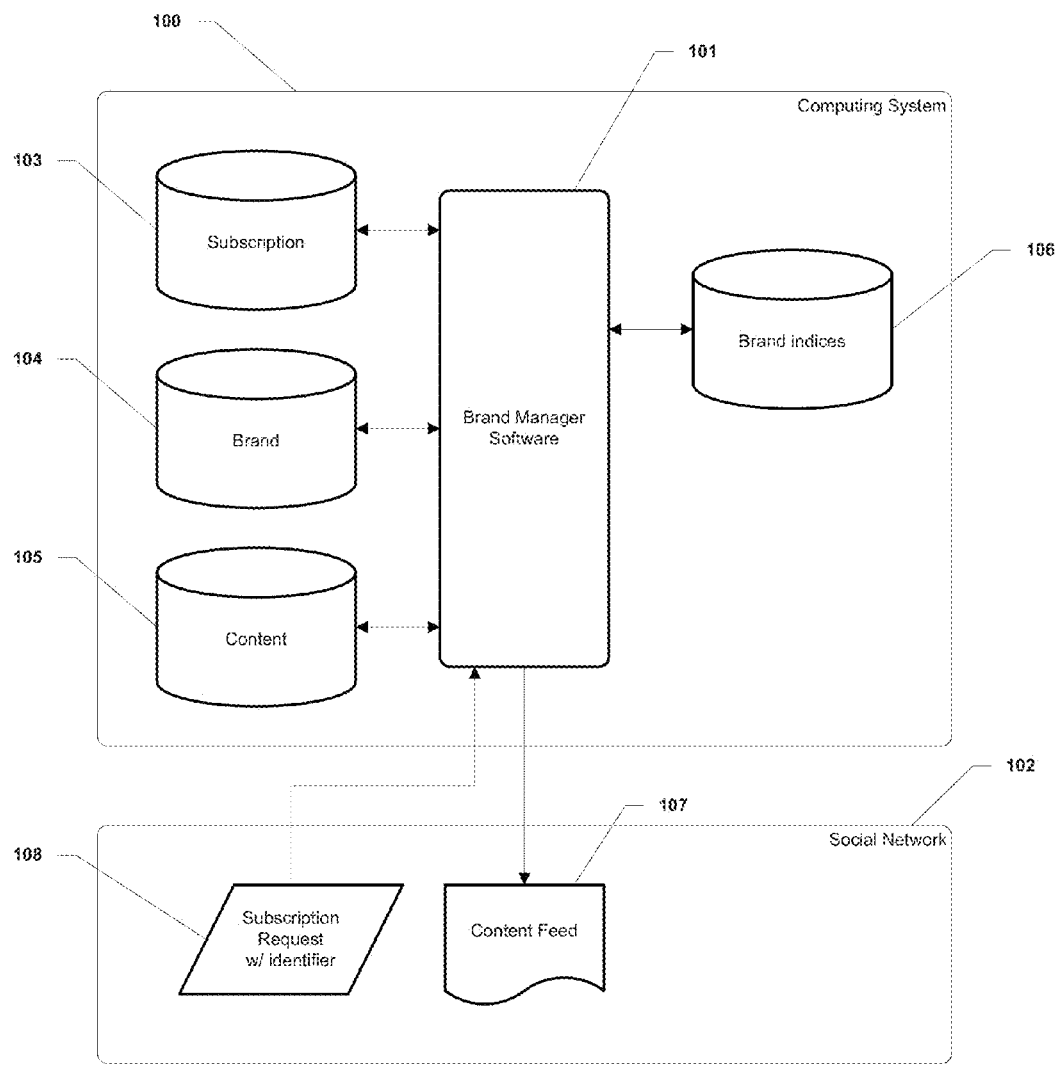
FIG. 1 depicts example components for crowdsourcing user-provided brand identifiers and coalescing the identifiers for association with one or more brand identities.

FIG. 1 depicts example components for crowdsourcing user-provided brand identifiers and coalescing the identifiers for association with one or more brand identities, according to one aspect of the subject technology. A computing system 100 (for example, one or more processors, computers, and/or server computers) is configured with a software module 101 for management of brand identities and user interest in those identities. Software module 101 is configured to send, receive, and manage data communicated between one or more storage locations and one or more components of a community product 102. In the depicted example, community product 102 is a social network, including one or more computing devices and related software.

Computing system 100 includes one or more data storages for association of brand identifiers with groups of identifiers, and brand identities. A subscription storage 103 is configured to store content subscription requests made by community members of the social network. A subscription request includes, for example, an indication of an interest of a community member to subscribe to content associated with a user-provided identifier (e.g., a hashtag). In this regard, the community member may provide the identifier in a social media message, for example, posted to the member's activity stream. Content annotated with the identifier may then be distributed to the subscribing community member.

A brand identity storage 104 is configured to store brand identities for established brands. A brand identity includes a name or other representation of a known retail product, manufacturer, celebrity, or the like. A content storage 105 is configured to store brand-related content for delivery to community members through channels in the community product. For example, brand-related content may include photos or other digital representation(s) of a product or celebrity related to a brand, advertisements, articles about a brand or related products and entities, interactive links (e.g., hyperlinks) to a web page related to the brand, and the like.

A brand indices storage 106 correlates the information in subscription storage 103, brand identity storage 104, and content storage 105. For example, indices storage 106 may pair a user-provided identifier stored in subscription storage 103 with one or more aggregate groups of identifiers, or with one or more brand identities stored in brand identity storage 104. In some aspects, brand indices storage 106 may facilitate delivery of content to community members by providing software module 101 with indices for brand identities stored in identity storage 104. Software module 101 may use the indices in determining what content in content storage 106 to deliver in connection with a subscription request stored in subscription storage 103.

Computing system 100 may include one computer (e.g., a server) or multiple computers. The functionality of computer system 100 and community product 102 may be implemented on the same physical computer or distributed among a plurality of computers. Similarly, the functionality of subscription storage 103, brand identity storage 104, and content storage 105, and indices storage 106 may be implemented in the same storage device or computer, or distributed across a plurality of storage devices or computers. Moreover, the storages may take any form such as relational databases, object-oriented databases, file structures, text-based records, or other forms of data repositories. While each storage is illustrated as a single storage, it is understood that software module 101 can control access to and coordinate retrieval of information from a cloud computing environment including multiple databases and database servers.

Computing system 100 may be further connected via a network to an online community product (e.g., a social network), and/or one or more client devices (for example, a personal computer, server, smart phone, PDA, tablet, or the like). For example, the various computers and/or storages may be connected to and/or communicate with each other via the Internet, or a private LAN/WAN. In some aspects, the various connections may be made over a wired or wireless connection.

Computing system 100 (for example, a server running software module 101) may be configured to communicate with a content feed 107 of community product 102. Content feed 107 may provide content to one or more members of community product 102 via integration with respective activity feeds for the members. Likewise, computing system 100 is configured to facilitate the receiving by software module 101 of content subscription requests 108 from community members. In some implementations, content subscription requests 108 are extracted from one or more data sources in community product 102, or from messages transmitted within community product 102.

Figure 2:
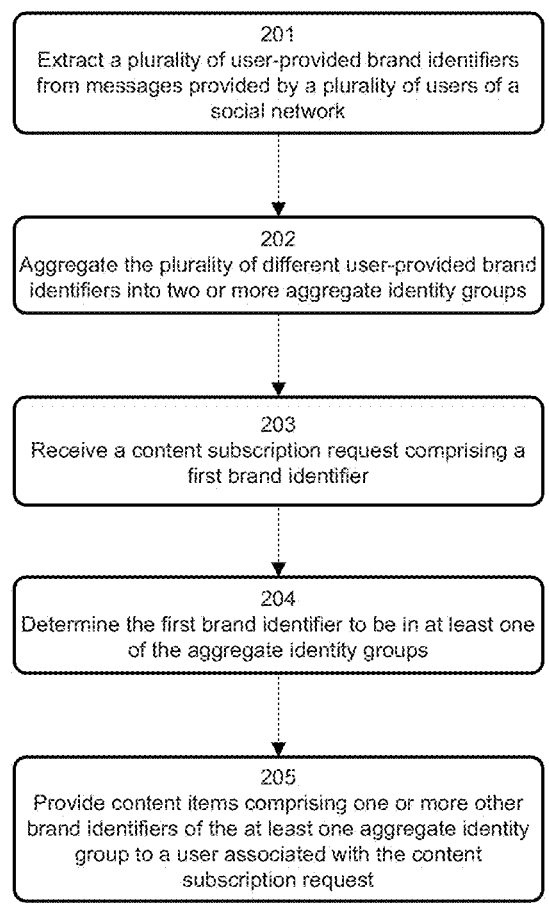
FIG. 2 is a flowchart illustrating an example process for crowdsourcing user-provided brand identifiers and distributing content based on crowd-sourced identifiers.

FIG. 2 is a flowchart illustrating an example process for crowdsourcing user-provided brand identifiers and distributing content based on crowd-sourced identifiers. According to some aspects, one or more blocks of FIG. 2 may be executed by computing system 100 (including, e.g., software module 101). Similarly, a non-transitory machine-readable medium may include machine-executable instructions thereon that, when executed by a computer or machine, perform the blocks of FIG. 2. Accordingly, the blocks of FIG. 2 may be performed within the context of a social network system environment.

In block 201, a plurality of user-provided brand identifiers are extracted from messages provided by a plurality of users of a social network. The messages may include, for example, posts to an activity stream and other social media messages transmitted within the social network. The user-provided brand identifiers may be identified from the use of special characters (e.g., #, $, %, and the like) at the beginning of a character string, or within a character string. In some aspects, a user-provided identifier is a hashtag.

In block 202, the plurality of different user-provided brand identifiers are aggregated into two or more aggregate identity groups. Some identifiers may be different in spelling, but refer to the same subject matter. Accordingly, the plurality of user-provided brand identifiers are aggregated into the two or more aggregate identity groups based on a predetermined algorithm. In some implementations, spelling heuristics may be used to identify similar identifiers. For example, the predetermined algorithm may compare the plurality of different user-provided brand identifiers using a phonetic algorithm, approximate string matching, or by determining the edit distance or hamming distance between string representations of each of the different brand identifiers. Computing system 100 may determine a confidence value associated with a respective identifier, indicating how likely the identifier is related to other identifiers, for example, in an aggregate identity group. Identifiers may be automatically consolidated when respective confidence values satisfy a predetermined threshold. In some implementations, only user-provided identifiers that meet a certain level of popularity are analyzed and consolidated.

In some implementations, the subject technology extends an interface to content managers (e.g., volunteers and owners of the community product) for manual consolidation of the identifiers. The interface may provide sorting and selection of user-provided identifiers based on selection criteria. For example, identifiers may be ranked according to popularity, time ranges, and the like, and then provided to the interface for display based on the ranking. Computing system 100 may provide confidence values in connection with identifiers. In this regard, when a confidence value of a certain identifier does not satisfy the predetermined threshold, computing system 100 may suggest the identifier for consolidation as a less confident suggestion. Using popularity, confidence values, and the like, content managers may prioritize which identifiers needs consolidation.

In block 203, a content subscription request comprising a first brand identifier is received. In some aspects, the first brand identifier is received as part of a message transmitted in the social network. The social network may be configured to detect the use of brand identifiers (e.g., by the use of special characters) by a community member and, on detecting a brand identifier, provide the member the option to subscribe to content related to the detected identifier. The member may then initiate the content subscription request in response to affirmatively selecting the option to subscribe. Additionally or in the alternative, the member may opt-in to automatically receive content related to brand identifiers used by the member.

In block 204, the first brand identifier is determined to be in at least one of the aggregate identity groups. The first brand identifier may be determined to be in a group by a directly matching a previously stored brand identifier of the group. Additionally or in the alternative, the first brand identifier may be consolidated into the group as described in block 202.

In block 205, content items comprising one or more other brand identifiers of the at least one aggregate identity group are provided to a user associated with the content subscription request. The content items may be provided, for example, in an the user's activity stream, or in a stream specifically configured to receive content for the first brand identifier. Additionally, content items may include email, blog posts, or social media messages transmitted within the social network by other users of the social network. Computing system 100 may search the user's social graph for uses of brand identifiers related to the at least one aggregate identity group, and provide messages and other content identified by those brand identifiers to the user.

Using the process of FIG. 2, community members can subscribe to any identifier, much like they would subscribe to another member's content. By subscribing to an identifier, a member receives content associated with the identifier. For example, content is associated with an identifier by annotating the content with the identifier, for example, an explicit hashtag within the content or as part of a message connected to the content. When the identifier is not associated with any particular brand the subscribing member may receive content made available from other members. Since the identifier used by one member is aggregated into a group of similar identifiers, the member need not expand the set of identifiers to which he or she is subscribing to receive more content, as more identifiers and related content are made available on that subscription from other members.

Additionally or in the alternative, many brand identifiers (e.g., predetermined or user-provided) can be associated with a general identifier which is used to replace occurrences of the consolidated identifiers in content and subscriptions. However, associating user-provided identifiers as described previously without the need to replace them allows the computing system 100 to retain the same identifier type before and after consolidation, which simplifies the overall design.

Figure 3:
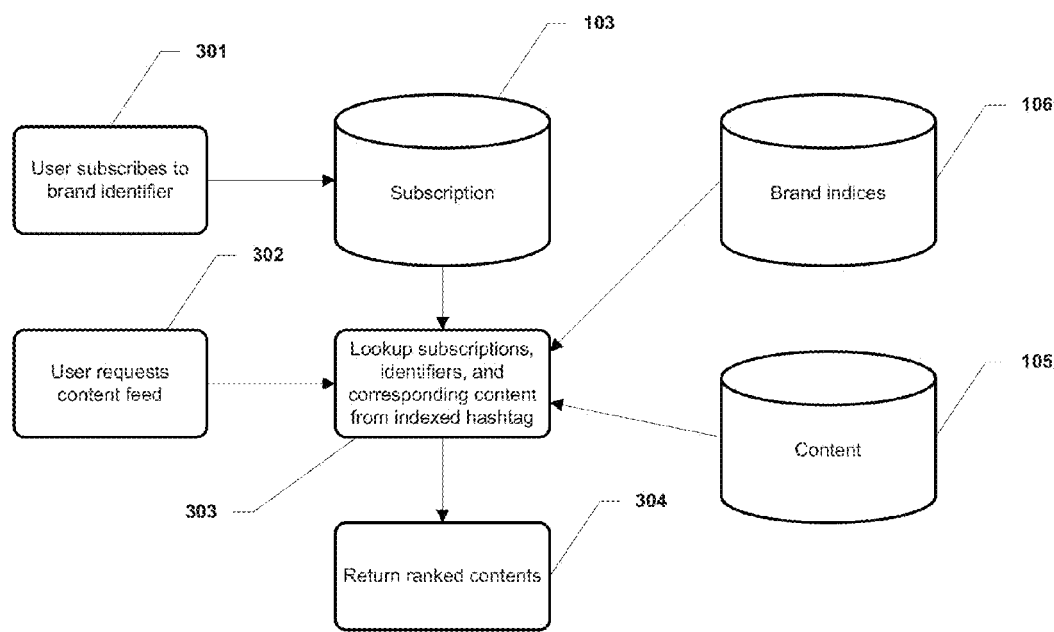
FIG. 3 is an example system flow diagram for crowdsourcing user-provided brand identifiers and distributing content based on crowd-sourced identifiers.

FIG. 3 is a system flow diagram for crowdsourcing user-provided brand identifiers and distributing content based on crowd-sourced identifiers, according to some aspects of the subject technology. When a community member subscribes 301 to a brand identifier (e.g., a hashtag), a content subscription request is recorded in subscription storage 103. Content subscription requests may be the functional equivalent of a request for content related to the brand identifier, but not necessarily in all cases. For example, the member may use a brand identifier, which gets recorded in subscription storage 103, but not request content 302 until a later time.

In either case, computing system 100 analyzes content subscription requests in subscription storage 103 and accesses indices storage 106 based on corresponding brand identifiers to determine content stored in content storage 105. In this regard, computing system 100 identifies 303 user-provided brand identifiers in subscription storage 103, and determines content in content storage 105 from the index for each brand identifier stored in indices storage 106. In some aspects, computing system 100 may then rank 304 content items returned from content storage 105 based on the number of corresponding content subscription requests in subscription storage 103 for each content item.

Figure 4:
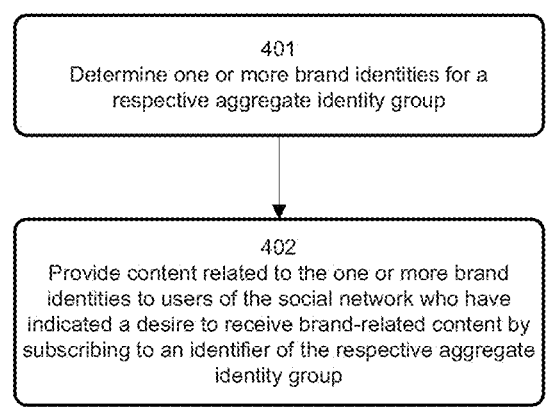
FIG. 4 is a flowchart illustrating an example a process for associating user-provided brand identifiers with brand identities.

FIG. 4 is a flowchart illustrating an example a process for associating user-provided brand identifiers with brand identities, according to some aspects of the subject technology. The blocks of FIG. 4 may optionally follow the blocks of FIG. 2, depending on whether an aggregate identity groups is being associated with one or more brand identities. Ultimately, once an official brand identity is associated with one user-provided identifier, a content manager for the brand identity is able to manage the brand representation along related aggregate identifiers and their subscriptions. Moreover, content managers may define brand entities and associate these entities with as many user-provided identifiers as possible.

In block 401, one or more brand identities are determined for a respective aggregate identity group. In various aspects, a respective brand identity may be representative of a celebrity, a retail product, a product manufacturer, or other entity to which content may be attributed.

In block 402, content related to the one or more brand identities is provided to users of the social network who have indicated a desire to receive brand-related content by subscribing to an identifier of the respective aggregate identity group. In one example, the first brand identifier is not currently associated with any aggregate identity group. After receiving the first brand identifier, the first brand identifier is associated with the respective aggregate identity group, and content related to the one or more brand identities provided to the user associated with the content subscription request.

Figure 5:
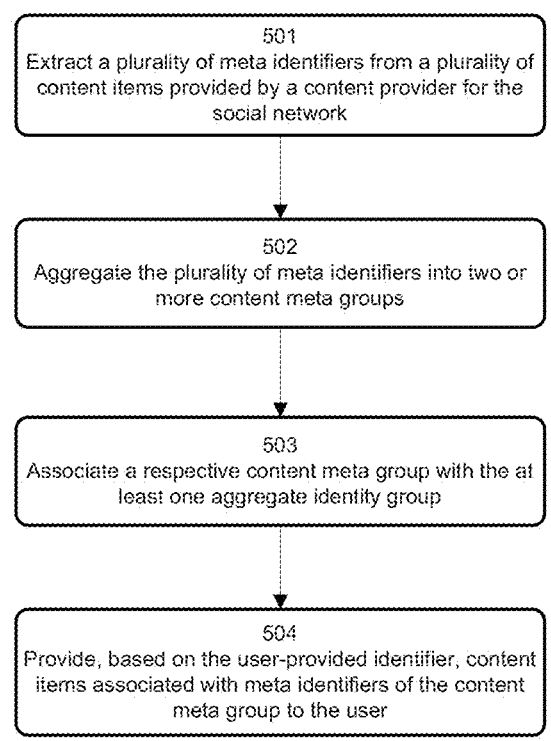
FIG. 5 is a flowchart illustrating an example a process for associating user-provided brand identifiers with brand identities.

FIG. 5 is a flowchart illustrating an example a process for associating user-provided brand identifiers with brand identities, according to some aspects of the subject technology. The blocks of FIG. 5 may optionally follow the blocks of FIG. 2.

In block 501, a plurality of meta identifiers are extracted from a plurality of content items provided by a content provider for the social network. A content manager may annotate content items with one or more meta identifiers to associate the content items with predetermined content types, or to distribute the content items to a predetermined demographic. Meta identifiers may include meta data about the content items or describe the content items. For example, a meta identifier may include a product or brand name, a product type, a service or service type, a name of a celebrity, a location or place, or any other information that may be used to associate the content with other content. In some aspects, a meta identifier may be structured like the previously described user-provided brand identifiers (e.g., may be a hashtag, or start with a special character).

In some aspects, meta identifiers (and brand identifiers) may be constructed by detecting and selecting identifiable information (e.g., a name), for example, from within the content. In this manner, keywords variations may be normalized without relying solely on machine learning thus allow high quality association on low volumes of data, and content creators are encouraged to provide meta information which in itself has other rich data making the overall quality of content better for the consumer.

In block 502, the plurality of meta identifiers are aggregated into two or more content meta groups. The meta identifiers may be consolidated into the group as described in block 202 for brand identifiers. Additionally or in the alternative, the meta identifiers may be aggregated into a group by manually placing them into the group. For example, computer system 100 may extend a management console that includes a selection screen for selection and grouping of meta identifiers detected by computer 100.

In block 503, a respective content meta group is associated with the at least one aggregate identity group. In some implementations, associating the respective content meta group may include comparing one or more meta identifiers of the respective content meta group with one or more identifiers of the at least one aggregate identity group, and determining, based on the comparing, that the one or more meta identifiers are related to the one or more identifiers. The comparison may be made according to the process described in blocks 502 and 202.

In block 504, based on the user-provided identifier, content items associated with meta identifiers of the content meta group are provided to the user. In this regard, the content items need not be manually assigned a specific destination, but may be distributed to community users in the same way as described previously with respect to block 205 (e.g., as a post to an activity stream).

Accordingly, content may be distributed to members in two ways. First, the user can provide explicit identifiers (e.g., as hashtags) in content provided by the user (e.g., in a social network post). Second, a content manager may associate content with brand-related meta information, for example, corresponding to a product, place, person, or the like. The meta data may be selected from one or more predetermined sets of meta data, or by entering new data in connection with the content. The meta data provides rich content, and may be used to determine the relevance of the content as well as its relationship to others. Specifically, the meta data may become meta identifiers which may be aggregated into groups for a brand identity in the same way as user-provided identifiers. For example, the subject technology may convert identifiable aspects of meta data (e.g. name) to hashtags that get added to the regular hashtag pool and can be consolidated with others as indicating a single brand entity. Accordingly, users may add rich content that is great for their audience, and which will automatically and simultaneously expand in distribution channels through the previously defined process. Accordingly, the content manager need not worry about how to position their content to benefit from wider distribution (ie. the correct tag to use or the correct spelling of a brand name) because the subject technology consolidate all variants and ensures the desired distribution.

Figure 6:
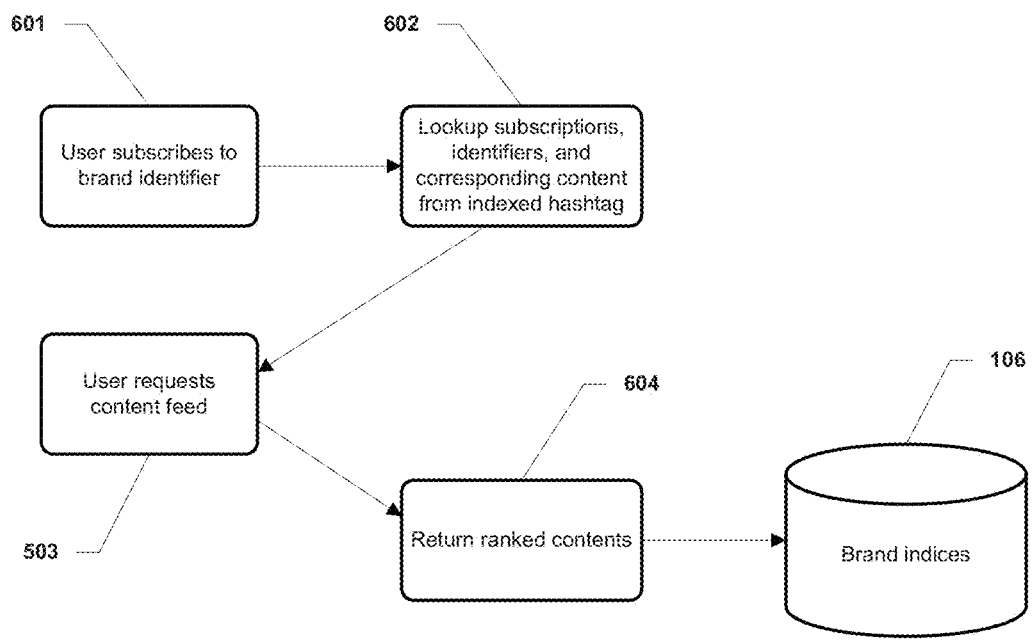
FIG. 6 is an example system flow diagram for indexing content meta identifiers.

FIG. 6 is an example system flow diagram for indexing content meta identifiers, according to some aspects of the subject technology. In block 601, a content manager annotates content with certain meta data. In block 602, meta identifiers are extracted from the meta data associated with each content item. In block 603, the extracted meta identifiers are normalized to produce a common meta identifier for the content items. Then, in block 604, each content item is indexed by the common meta identifier and stored in indices storage 106.

The previously described processes of FIGS. 2-6 provide several advantages. For example, a proxy for popular brand entities is provided, reducing the need for those entities presence within community product 102 to attract community growth. The distribution of information is increased in a way that does not require content creators to know exactly how to construct the correct distribution terms (e.g the right hashtag to maximize distribution), and consumers do not have to know the most relevant or popular representation of a brand entity (e.g., a name, hashtag, or the like) to subscribe to in order to get relevant content about that brand entity. And, the process for identifying which brand entities a community should prioritize for partnership or onboarding is streamlined, and a ready audience is created for a brand identity for the brand entity as well as an easier way for the brand entity to evaluate its distribution return on investment for joining the community product. Accordingly, the subject technology facilitates distributing and receiving relevant content at low cost to content creators and consumers while mitigating empty room situations caused, in part, by not having well-known content sources in new and growing community products.

Additionally or in the alternative, in some implementations, a brand identity may be associated with any keyword rather than using one form of user-provided identifiers as an intermediary. Also, brand identities may be provided directly to the member community as subscribable entities no different from other community members, and not expose brand identifiers for following or subscribing to the brand identities to receive related content. In this case, meta information may still be combined in the previously described manner to correlate content to the brand identities.

In some implementations, user-provided identifiers may be resolved to their associated brands before committing a subscription. Similarly, a meta identifier for one or more content items could be resolved prior to indexing the content. In either case, much of the offline post-processing may be done just-in-time (e.g., as a background process initiated immediately after an identifier is introduced into the system). One advantage of applying things offline is that fewer lookups are required and the system scales better as the number of annotations per content item increases. An offline process also affords other content computations while the user-provided identifiers are being resolved, including scoring and the like which would otherwise be expensive in terms of processing power and time in real-time.

Figure 7:
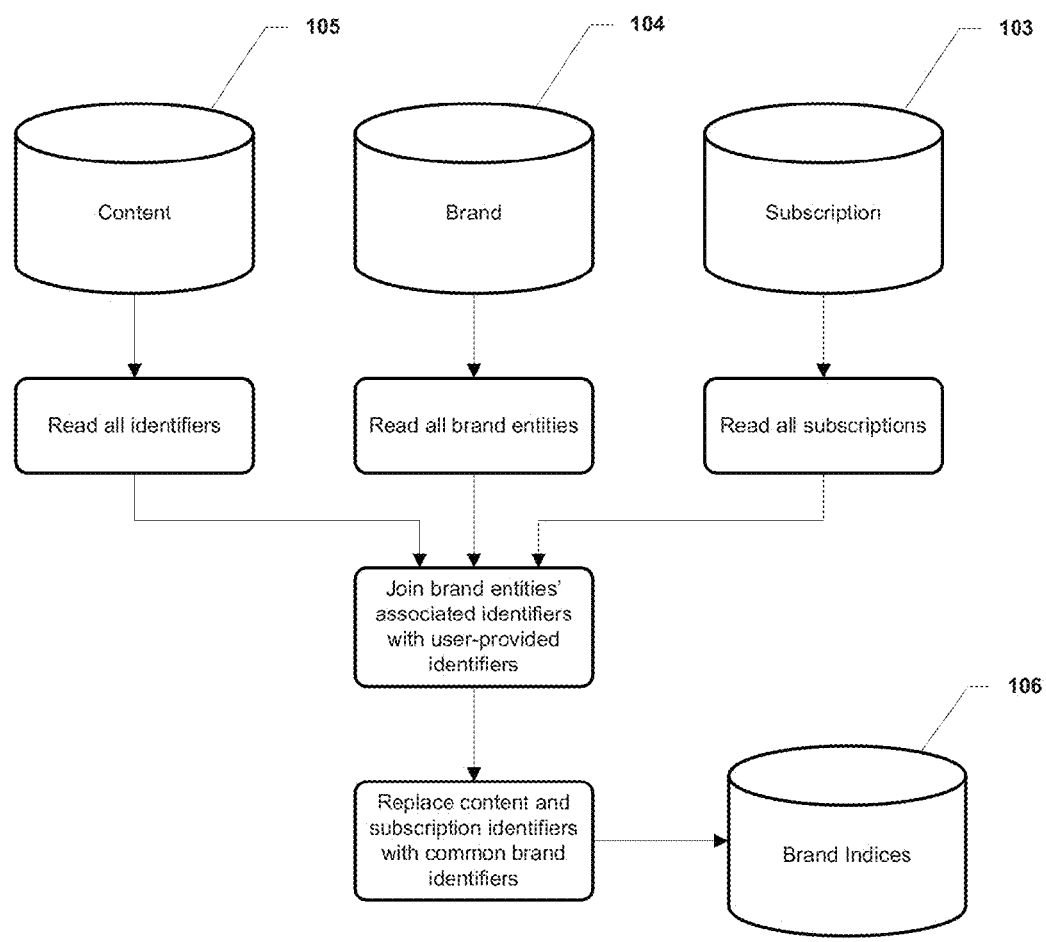
FIG. 7 is an example system flow diagram for associating content items with content subscription requests using a common brand identifier.

FIG. 7 is an example system flow diagram for associating content items with content subscription requests using a common brand identifier, according to some aspects of the subject technology. In the depicted example, computing system 100 reads all content meta identifiers, all brand identities, and all content subscription requests, and associates the brand identities (e.g., using meta data for the brand identities) with the user-provided brand identifiers obtained from the subscription requests. The meta identifiers for content items associated with the brand identifiers provided in subscription requests, and those brand identifiers, are then replaced with a common brand identifier for each corresponding brand identity. Computing system 100 then re-indexes the associated content items with the common brand identifier, and updates the associated content subscription requests in indices storage 106.

Figure 8:
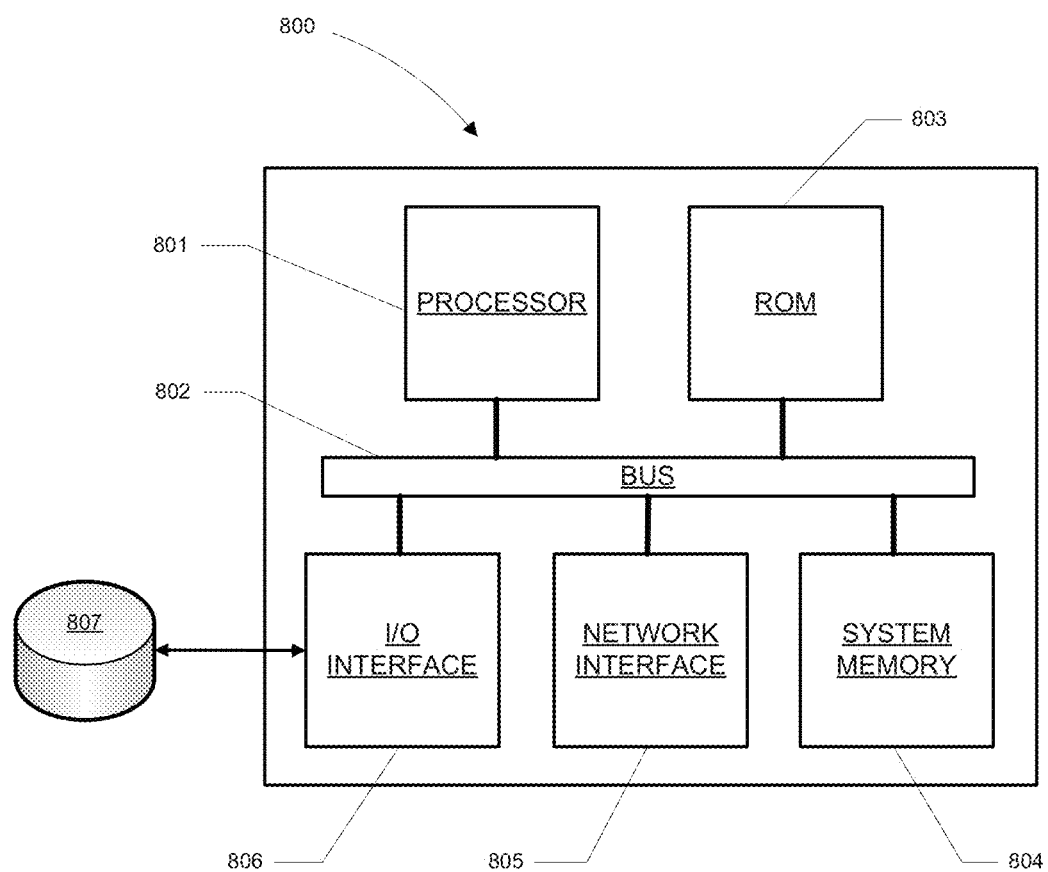
FIG. 8 is a diagram illustrating an example computing device for crowdsourcing user-provided brand identifiers and coalescing the identifiers for association with one or more brand identities, including a processor and other internal components.

FIG. 8 is a diagram illustrating an example computing device for crowdsourcing user-provided brand identifiers and coalescing the identifiers for association with one or more brand identities, including a processor and other internal components, according to one aspect of the subject technology. In some aspects, a computerized device 800 (for example, a computing device of computing system 100 or community product 102) includes several internal components such as a processor 801, a system bus 802, read-only memory 803, system memory 804, network interface 805, I/O interface 806, and the like. In one aspect, processor 801 may also be communication with a storage medium 807 (for example, a hard drive, database, or data cloud) via I/O interface 806. In some aspects, all of these elements of device 800 may be integrated into a single device. In other aspects, these elements may be configured as separate components.

Processor 801 may be configured to execute code or instructions to perform the operations and functionality described herein, manage request flow and address mappings, and to perform calculations and generate commands. Processor 801 is configured to monitor and control the operation of the components in server 800. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on a ROM within processor 801. Likewise, one or more sequences of instructions may be software stored and read from ROM 803, system memory 804, or received from a storage medium 807 (for example, via I/O interface 806). ROM 803, system memory 804, and storage medium 807 represent examples of machine or computer readable media on which instructions/code may be executable by processor 801. Machine or computer readable media may generally refer to any medium or media used to provide instructions to processor 801, including both volatile media, such as dynamic memory used for system memory 804 or for buffers within processor 801, and non-volatile media, such as electronic media, optical media, and magnetic media.

In some aspects, processor 801 is configured to communicate with one or more external devices (for example, via I/O interface 806). Processor 801 is further configured to read data stored in system memory 804 and/or storage medium 807 and to transfer the read data to the one or more external devices in response to a request from the one or more external devices. The read data may include one or more web pages and/or other software presentation to be rendered on the one or more external devices. The one or more external devices may include a computing system such as a personal computer, a server, a workstation, a laptop computer, PDA, smart phone, and the like.

In some aspects, system memory 804 represents volatile memory used to temporarily store data and information used to manage device 800. According to one aspect of the subject technology, system memory 804 is random access memory (RAM) such as double data rate (DDR) RAM. Other types of RAM also may be used to implement system memory 804. Memory 804 may be implemented using a single RAM module or multiple RAM modules. While system memory 804 is depicted as being part of device 800, it should be recognized that system memory 804 may be separate from device 800 without departing from the scope of the subject technology. Alternatively, system memory 804 may be a non-volatile memory such as a magnetic disk, flash memory, peripheral SSD, and the like.

I/O interface 806 may be configured to be coupled to one or more external devices, to receive data from the one or more external devices and to send data to the one or more external devices. I/O interface 806 may include both electrical and physical connections for operably coupling I/O interface 806 to processor 801, for example, via the bus 802. I/O interface 806 is configured to communicate data, addresses, and control signals between the internal components attached to bus 802 (for example, processor 801) and one or more external devices (for example, a hard drive). I/O interface 806 may be configured to implement a standard interface, such as Serial-Attached SCSI (SAS), Fiber Channel interface, PCI Express (PCIe), SATA, USB, and the like. I/O interface 806 may be configured to implement only one interface. Alternatively, I/O interface 806 may be configured to implement multiple interfaces, which are individually selectable using a configuration parameter selected by a user or programmed at the time of assembly. I/O interface 806 may include one or more buffers for buffering transmissions between one or more external devices and bus 802 and/or the internal devices operably attached thereto.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method, comprising:
analyzing a plurality of messages provided by a plurality of users of a social network;
extracting a plurality of different user-provided brand identifiers from the analyzed plurality of messages;
aggregating the extracted plurality of different user-provided brand identifiers into two or more aggregate identity groups of brand identifiers;
receiving, by one or more computing devices via an electronic network, a content subscription request, comprising a first brand identifier, from a social network message post, wherein the first brand identifier is not currently associated with the aggregate identity groups of brand identifiers when the content subscription request is received;
determining, using the one or more computing devices, that the first brand identifier is associated with one or more second brand identifiers in the plurality of different user-provided brand identifiers;
associating, in response to determining that the first brand identifier is associated with the one or more second brand identifiers, the first brand identifier with at least one of the aggregate identity groups of brand identifiers; and
providing, in response to the associating the first brand identifier, content items comprising one or more other brand identifiers of the at least one aggregate identity group to a user associated with the content subscription request.

2. The computer-implemented method of claim 1, further comprising:
determining, for a respective aggregate identity group, one or more brand identities; and
providing content related to the one or more brand identities to users of the social network who have indicated a desire to receive brand-related content by subscribing to a brand identifier of the respective aggregate identity group.

3. The computer-implemented method of claim 2, wherein a respective brand identity is representative of a celebrity, a retail product, or a product manufacturer.

4. The computer-implemented method of claim 1, wherein the plurality of different user-provided brand identifiers are aggregated into two or more aggregate identity groups of brand identifiers based on a predetermined algorithm.

5. The computer-implemented method of claim 4, wherein the predetermined algorithm comprises comparing the plurality of different user-provided brand identifiers using a phonetic algorithm, approximate string matching, or by determining an edit distance or hamming distance between each of the different user-provided brand identifiers.

6. The computer-implemented method of claim 1, further comprising:
extracting a plurality of meta identifiers from a plurality of content items provided by a content provider for the social network;
aggregating the plurality of meta identifiers into two or more content meta groups;
associating a respective content meta group with the at least one aggregate identity group; and providing, based on the user-provided identifier, content items associated with the plurality of meta identifiers of the content meta group to the user.

7. The computer-implemented method of claim 6, wherein associating the respective content meta group with the at least one aggregate identity group comprises:
comparing one or more meta identifiers of the respective content meta group with one or more identifiers of the at least one aggregate identity group; and
determining, based on the comparing, that the one or more meta identifiers are related to the one or more identifiers.

8. The computer-implemented method of claim 1, wherein a respective user-provided brand identifier is a hashtag.

9. The computer-implemented method of claim 1, wherein the content items comprise social media messages transmitted within the social network by other users of the social network.

10. A non-transitory machine-readable medium having machine-executable instructions stored thereon, which when executed by a machine or computer cause the machine or computer to perform a method, comprising:
receiving, by one or more computing devices via an electronic network, a plurality of different brand identifiers from a plurality of users in a social network;
coalescing the received plurality of different brand identifiers into two or more groups of similar brand identifiers based on a predetermined algorithm;
receiving a content subscription request for one or more brand identifiers of a respective group of similar brand identifiers, wherein the one or more brand identifiers is not currently associated with the two or more groups when the content subscription request is received;
requesting, in response to receiving the content subscription request, whether a user associated with the content subscription request is interested in subscribing to content related to the one or more brand identifiers when it becomes available;
receiving, in response to the requesting, an indication that the user is interested in receiving content for the one or more brand identifiers;
associating, using the one or more computing devices after receiving the indication, the one or more brand identifiers with at least one of the two or more groups; and
associating, using the one or more computing devices after the one or more brand identifiers are associated with the at least one of the two or more groups, the one or more brand identifiers with one or more brand identities so that a subsequent search based on the one or more brand identifiers returns content for the one or more brand identities.

11. The non-transitory machine-readable medium of claim 10, the method further comprising:
performing the subsequent search; and
providing the content for the one or more brand identities to the user.

12. The non-transitory machine-readable medium of claim 10, wherein the predetermined algorithm comprises a phonetic algorithm, approximate string matching, or determining an edit distance or hamming distance between each of the plurality of different brand identifiers.

13. The non-transitory machine-readable medium of claim 10, the method further comprising:
determining a popularity rating for one or more of the plurality of different brand identifiers; and
providing one or more of the plurality of different brand identifiers for display according to their popularity ratings.

14. The non-transitory machine-readable medium of claim 10, wherein the step of coalescing comprises:
providing an interface for selection of one or more of the plurality of different brand identifiers; and
receiving an instruction to place a selected one of the different brand identifiers into one of the two or more groups of similar brand identifiers.

15. The non-transitory machine-readable medium of claim 10, wherein associating the one or more brand identifiers with the one or more brand identities comprises replacing the one or more brand identifiers with a common brand identifier for the one or more brand identities.

16. The non-transitory machine-readable medium of claim 10, wherein the content returned for the one or more brand identities comprises returning content that is provided to activity streams of one or more users of the social network in connection with the one or more associated brand identifiers.

17. The non-transitory machine-readable medium of claim 10, the method further comprising:
receiving content items annotated with meta data;
coalescing meta data that satisfies a threshold of similarity; and
associating the coalesced meta data with the respective group of similar brand identifiers,
wherein the returned content comprises content items associated with the coalesced meta data.

18. A system, comprising:
a processor; and
a memory including instructions that, when executed by the processor, causes the processor to:
extracting a plurality of different user-provided identifiers from plurality of messages provided by a plurality of users;
determine that two or more of the plurality of different user-provided identifiers refer to an established brand;
in response to the two or more of the plurality of different user-provided identifiers being determined to refer to the established brand, aggregate the two or more different user-provided identifiers into an aggregate brand identity group associated with the established brand so that the established brand may be indexed by any one of the user-provided identifiers in the aggregate brand identity group;
aggregate other identifiers of the plurality of different user-provided identifiers into two or more aggregate identity groups of brand identifiers, the aggregate identity groups comprising the aggregate brand identity group;
receive a subsequent identifier from a user, wherein the subsequent identifier is not currently associated with the established brand when it is received;
determine that the subsequent identifier is associated with a respective user-provided identifier in the aggregate brand identity group; and
in response to determining that the subsequent identifier received from the user is associated with the respective user-provided identifier in the aggregate brand identity group, return social network messages related to the established brand to the user.

19. A computer-implemented method, comprising:
identifying a plurality of messages provided by a plurality of users of a social network;

extracting a plurality of different user-provided identifiers from the identified plurality of messages;

aggregating the extracted plurality of different user-provided identifiers into aggregate identity groups of brand identifiers;

receiving, by one or more computing devices via an electronic network, a request for social media content, the request comprising a first brand identifier, wherein the first brand identifier is not currently associated with the aggregate identity groups of brand identifiers when the request for social media content is received;

determining, using the one or more computing devices, that the first brand identifier is associated with one or more second brand identifiers in the plurality of different user-provided identifiers;

associating, using the one or more computing devices in response to determining that the first brand identifier is associated with the one or more second brand identifiers, the first brand identifier with at least one of the aggregate identity groups of brand identifiers; and providing, in response to the associating the first brand identifier, content items comprising one or more other brand identifiers of the at least one aggregate identity group to a user associated with the request for social media content.

20. The computer-implemented method of claim 19, further comprising:

determining, for a respective aggregate identity group, one or more brand identities; and providing content related to the one or more brand identities to users of the social network who have sent a request to receive brand-related content that includes an identifier of the respective aggregate identity group.

21. The computer-implemented method of claim 20, wherein the first identifier is not currently associated with any aggregate identity group, the method further comprising:

after receiving the first identifier, associating the first identifier with the respective aggregate identity group; and providing, based on the associating, content related to the one or more brand identities to the user associated with the request comprising the first identifier.

22. A non-transitory machine-readable medium having machine-executable instructions stored thereon, which when executed by a machine or computer cause the machine or computer to perform a method, comprising:

receiving a plurality of different identifying tags from a plurality of users in a social network;

coalescing the received plurality of different identifying tags into groups of similar identifying tags based on a predetermined algorithm;

receiving, by one or more computing devices via an electronic network, a content subscription request for one or more identifying tags of a respective group of similar identifying tags, wherein the one or more identifying tags is not currently associated with groups of similar identifying tags when the content subscription request is received;

requesting, in response to receiving the content subscription request, whether a user associated with the content subscription request is interested in subscribing to content related to the one or more identifying tags when it becomes available;

receiving, in response to the requesting, an indication that the user is interested in receiving content for the one or more identifying tags;

associating, using the one or more computing devices after receiving the indication, the one or more with at least one of the groups of similar identifying tags; and associating, using the one or more computing devices after the one or more identifying tags are associated with the at least one of the groups of similar identifying tags, the one or more identifying tags with one or more brand identities; and providing, based on the content subscription request, content for the one or more brand identities to the user.

23. The machine-readable medium of claim 22, the method further comprising:

receiving content items annotated with meta data;

coalescing meta data that satisfies a threshold of similarity; and associating the coalesced meta data with the respective group of similar identifying tags, wherein the provided content comprises content items associated with the coalesced meta data.

* * * * *